(12) United States Patent
Zhu et al.

(10) Patent No.: US 10,819,221 B1
(45) Date of Patent: Oct. 27, 2020

(54) QUICK START CONTROL METHOD AND SYSTEM FOR BUCK CIRCUIT

(71) Applicant: Wenzhou University, Wenzhou, Zhejiang (CN)

(72) Inventors: Xiang'ou Zhu, Wenzhou (CN); Yu Xu, Wenzhou (CN); Qi Tang, Wenzhou (CN); Yuxing Dai, Wenzhou (CN)

(73) Assignee: Wenzhou University (CN)

( * ) Notice: Subject to any disclaimer, the term of this patent is extended or adjusted under 35 U.S.C. 154(b) by 0 days.

(21) Appl. No.: 16/564,877

(22) Filed: Sep. 9, 2019

(30) Foreign Application Priority Data

Jul. 2, 2019 (CN) .......................... 2019 1 0588265

(51) Int. Cl.
*H02M 1/36* (2007.01)
*H02M 3/156* (2006.01)

(52) U.S. Cl.
CPC ............. *H02M 1/36* (2013.01); *H02M 3/156* (2013.01)

(58) Field of Classification Search
CPC ......... H02M 3/158; H02M 1/36; H02M 3/156
See application file for complete search history.

(56) References Cited

U.S. PATENT DOCUMENTS

2016/0233768 A1* 8/2016 de Cremoux ......... H02M 1/083
2016/0373002 A1* 12/2016 Borfigat ................ H02M 3/156

* cited by examiner

*Primary Examiner* — Jue Zhang
*Assistant Examiner* — Trinh Q Dang
(74) *Attorney, Agent, or Firm* — Lerner, David, Littenberg, Krumholz & Mentlik, LLP (57) ABSTRACT

The present invention discloses a quick start control method and system for a Buck circuit. According to the control method and system provided by the present invention, by controlling a duty ratio of a switch of the Buck circuit within an initial start time period, i.e., a total-on (Ton) time period, at 1, an output voltage can rise at a fastest rate and a capacitor can be charged; and then, by controlling the duty ratio of the switch of the Buck circuit within a Toff time period at 0, the output voltage keeps to rise and simultaneously is stabilized at an expected value. With the adoption of the control method and system provided by the present invention, the overshoot and oscillation caused by the output voltage in a start process of the Buck circuit can be effectively reduced, and the start time of the Buck circuit is shortened.

6 Claims, 5 Drawing Sheets

QUICK START CONTROL METHOD AND SYSTEM FOR BUCK CIRCUIT

CROSS REFERENCE TO RELATED APPLICATIONS

This application claims priority from Chinese application number 201910588265.0, filed Jul. 2, 2019, the disclosure of which is hereby incorporated herein by reference.

TECHNICAL FIELD

The present invention relates to the field of a switch converter, and in particular to a quick start control method and system for a Buck circuit.

BACKGROUND

Along with the development of a semiconductor power device technology, a switch converter is broadly applied to fields such as aviation, industry, low-voltage electrical appliances and military. A switch converter using pulse-width modulation (PWM) is generally started within tens to hundreds of milliseconds. However, for an application occasion having a strict requirement on start time, for example in an emergency condition, it is generally required that a switch converter used by a high-power laser power supply, and a fire-control radar and the like on a warcraft and a warship can put into operation within several to decadal milliseconds. In addition, the maximum operation time of a leakage protector at a specified leakage current is 40 ms; and when a short-circuit instantaneous protection characteristic test of a direct-current (DC) breaker is carried out, the DC breaker is required to be released within 0.1 s, and a switch converter used therein is required to complete power start, signal collection and analysis, trigger and release, and other actions within specified time. Therefore, how to quickly start the switch converter has become a technical problem to be solved urgently by a person skilled in the art.

SUMMARY

An objective of the present invention is to provide a quick start control method and system for a Buck circuit, which can effectively reduce the overshoot and oscillation caused by an output voltage in a start process of the Buck circuit, and shortens the start time of the Buck circuit.

To achieve the above purpose, the present invention provides the following solution.

A quick start control method for a Buck circuit includes:

obtaining an initial value of a step size, an initial value of a total-on (Ton) duration $t_1$, an initial value of a total-off (Toff) duration $t_2$ and a topological parameter of the Buck circuit;

substituting the topological parameter into a Ton capacitor voltage model and a Ton inductor current model to obtain a capacitor voltage value $U_c(t_1)$ and an inductor current value $i_L(t_1)$ of the Buck circuit at a $t_1$ moment, where the Ton voltage model is an expression of a capacitor voltage when a switch of the Buck circuit is in an on state, and the Ton inductor current model is an expression of an inductor current when the switch of the Buck circuit is in the on state;

substituting the topological parameter into a Toff capacitor voltage model and a Toff inductor current model to obtain a capacitor voltage value $U_c'(t_2)$ and an inductor current value $i_L'(t_2)$ of the Buck circuit at a $t_2$ moment, where the Toff voltage model is an expression of the capacitor voltage when the switch of the Buck circuit is in an off state, and the Toff inductor current model is an expression of the inductor current when the switch of the Buck circuit is in the off state;

determining whether a condition:

$$\frac{|U_c'(t_2) - U_c(\infty)|}{U_c(\infty)} \leq \Delta U_\infty \text{ and } \frac{|i_L'(t_2) - i_L(\infty)|}{i_L(\infty)} \leq \Delta i_\infty,$$

is met to obtain a first determining result, where the $U_c(\infty)$ represents a steady-state value of the capacitor voltage, the $i_L(\infty)$ represents a steady-state average value of the inductor current, the $\Delta U_\infty$ represents an output voltage error threshold, and the $\Delta i_\infty$ represents an inductor current error threshold;

when the first determining result indicates yes, controlling the switch of the Buck circuit to keep the on state in a [0, t1] time period and to keep the off state in a (t1, t2] time period; and when the first determining result indicates no, updating the Ton duration or the Toff duration according to a current step size, and returning to the "substituting the topological parameter into a Ton capacitor voltage model and a Ton inductor current model to obtain a capacitor voltage value $U_c(t_1)$ and an inductor current value $i_L(t_1)$ of the Buck circuit at a t1 moment".

A quick start control system for a Buck circuit includes:

a parameter obtaining module, configured to obtain an initial value of a step size, an initial value of a Ton duration $t_1$, an initial value of a Toff duration $t_2$ and a topological parameter of the Buck circuit;

a Ton parameter determination module, configured to substitute the topological parameter into a Ton capacitor voltage model and a Ton inductor current model to obtain a capacitor voltage value $U_c(t_1)$ and an inductor current value $i_L(t_1)$ of the Buck circuit at a $t_1$ moment, where the Ton voltage model is an expression of a capacitor voltage when a switch of the Buck circuit is in an on state, and the Ton inductor current model is an expression of an inductor current when the switch of the Buck circuit is in the on state;

a Toff parameter determination module, configured to substitute the topological parameter into a Toff capacitor voltage model and a Toff inductor current model to obtain a capacitor voltage value $U_c(t_2)$ and an inductor current value $i_L(t_2)$ of the Buck circuit at a $t_2$ moment, where the Toff voltage model is an expression of the capacitor voltage when the switch of the Buck circuit is in an off state, and the Toff inductor current model is an expression of the inductor current when the switch of the Buck circuit is in the off state;

a first determination module, configured to determine whether a condition:

$$\frac{|U_c(t_2) - U_c(\infty)|}{U_c(\infty)} \leq \Delta U_\infty \text{ and } \frac{|i_L(t_2) - i_L(\infty)|}{i_L(\infty)} \leq \Delta i_\infty,$$

is met to obtain a first determining result, where the $U_c(\infty)$ represents a steady-state value of the capacitor voltage, the $i_L(\infty)$ represents a steady-state average value of the inductor current, the $\Delta U_\infty$ represents an output voltage error threshold, and the $\Delta i_\infty$ represents an inductor current error threshold;

a control module, configured to control, when the first determining result indicates yes, the switch of the Buck circuit to keep the on state in a [0, t1] time period and to keep the off state in a (t1, t2] time period; and an update module, configured to update, when the first determining result indicates no, the Ton duration or the Toff duration according to a current step size.

According to specific embodiments provided in the present invention, the present invention discloses the following technical effects:

A quick start control method for a Buck circuit provided by the present invention includes: obtaining an initial value of a step size, an initial value of a Ton duration $t_1$, an initial value of a Toff duration $t_2$ and a topological parameter of the Buck circuit; substituting the topological parameter into a Ton capacitor voltage model and a Ton inductor current model to obtain a capacitor voltage value $U_c(t_1)$ and an inductor current value $i_L(t_1)$ of the Buck circuit at a t1 moment; substituting the topological parameter into a Toff capacitor voltage model and a Toff inductor current model to obtain a capacitor voltage value $U_c'(t_2)$ and an inductor current value $i_L(t_2)$ of the Buck circuit at a t2 moment; when a condition:

$$\frac{|U_c'(t_2) - U_c(\infty)|}{U_c(\infty)} \leq \Delta U_\infty \text{ and } \frac{|i_L'(t_2) - i_L(\infty)|}{i_L(\infty)} \leq \Delta i_\infty,$$

is met, controlling the switch of the Buck circuit to keep the on state in a [0, t1] time period and to keep the off state in a (t1, t2] time period; and when a first determining result indicates no, updating the Ton duration or the Toff duration according to a current step size. According to the control method and system provided by the present invention, by controlling a duty ratio of the switch of the Buck circuit within an initial start time period, i.e., a Ton time period, at 1, an output voltage can rise at a fastest rate and a capacitor can be charged; and then, by controlling the duty ratio of the switch of the Buck circuit within a Toff time period at 0, the output voltage keeps to rise and simultaneously is stabilized at an expected value. With the adoption of the control method and system provided by the present invention, the overshoot and oscillation caused by the output voltage in a start process of the Buck circuit can be effectively reduced, and the start time of the Buck circuit is shortened.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a quick start control method and system for a Buck circuit, which can effectively reduce the overshoot and oscillation caused by an output voltage in a start process of the Buck circuit, and shortens the start time of the Buck circuit.

To make the foregoing objective, features, and advantages of the present invention clearer and more comprehensible, the present invention is further described in detail below with reference to the accompanying drawings and specific embodiments.

Figure 1:
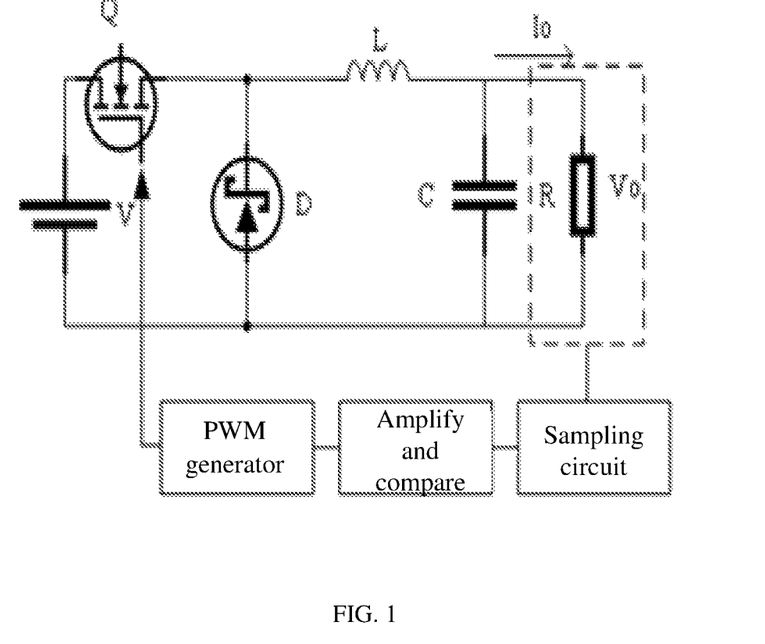
FIG. 1 is a schematic diagram of a closed-loop control system of a Buck circuit.

The Buck circuit is one of the most fundamental DC-DC circuits in a switch power supply. At present, the Buck circuit mainly obtains an error signal via a sampling circuit, amplifies the error signal and compares the error signal with a reference voltage, then obtains a modulated PWM signal via a PWM generator, and controls on-off of a switch tube by using a PWM signal, thereby implementing a closed-loop control system of the Buck circuit. The closed-loop control principle of the Buck circuit is as shown in FIG. 1.

A start process of the Buck circuit is analyzed. Within one cycle T, i.e., a [0-$t_2$] time period, when the switch tube is turned on, i.e., a (0-$t_1$) time period of an on time, the Buck circuit may be viewed as an LC two-order charging circuit, where an inductor L and a capacitor C are charged by a power supply and initial values for the L and the C are zero. A two-order differential equation about $U_c(t)$ and $i_L(t)$ is respectively established for the Buck circuit, and a capacitor voltage IMO and an inductor current $i_L(t_1)$ at a $t_1$ moment are solved, i.e., a zero-state response of the circuit is solved. Except for a zero-state response in a first on cycle, a full response is obtained in a subsequent on cycle.

The two-order differential equation established according to a topological schematic diagram when the Buck is on is:

$$LC\frac{d^2U_c}{dt^2} + \frac{L}{R}\frac{dU_c}{dt} + U_c = U_{in} \qquad (1)$$

Where, the R represents a load of the Buck circuit, the $U_{in}$ represents an input voltage, the $U_c$ represents a voltage at two ends of the capacitor, i.e., an output voltage, the C represents a capacitance value, and the L represents an inductance value.

A characteristic root of the equation is:

$$p_{1,2} = -\frac{1}{2RC} \pm \sqrt{\left(\frac{1}{2RC}\right)^2 - \frac{1}{LC}} \qquad (2)$$

Supposing $$\delta = \frac{1}{2RC}, \omega_0 = \frac{1}{\sqrt{LC}} \text{ and } \omega^2 = \frac{1}{LC} - \left(\frac{1}{2RC}\right)^2,$$

a particular solution is $U_c=U_{in}$. When the Buck circuit is in damped oscillation, a general solution formula is a formula (3). In the formula (3), the $C_1$ and the $C_2$ respectively represent a coefficient of the equation:

$$U_c(t) = e^{\alpha t}(C_1 \cos \beta t + C_2 \sin \beta t) \quad (3)$$

$$i_L(t) = C\frac{dU_c}{dt} + \frac{U_C}{R};$$

it may be seen from the zero state that $U_c(0_+)=U_c(0_-)=0$ and $i_L(0_+)=i_L(0_-)=0$; and by substituting the data, a Ton capacitor voltage model is:

$$U_c(t) = U_{in}\left(1 - \frac{e^{-\delta t}}{\sin\beta_1}\sin(\omega t + \beta_1)\right) \quad (4)$$

Similarly, the two-order differential equation about the $i_L(t)$ is established to obtain a Ton inductor current model:

$$i_L(t) = \frac{U_{in}}{R}\left(1 - \frac{e^{-\delta t}}{\sin\beta_2}\sin(\omega t + \beta_2)\right) \quad (5)$$

Where, $$\tan\beta_1 = \frac{\omega}{\delta} \text{ and } \tan\beta_2 = \frac{\omega L}{\delta L - R}.$$

When the switch tube is turned off, i.e., within a Toff time period ($t_1$-$t_2$), the Buck circuit may be viewed as an LC two-order discharge circuit, and initial values of the inductor L and the capacitor C respectively are a capacitor voltage $U_c(t_1)$ at a $t_1$ moment and an inductor current $i_L(t_1)$ at the $t_1$ moment. A two-order differential equation about the $U_c(t_2)$ and the current $i_L(t_2)$ is respectively established for the Buck circuit; and a capacitor voltage $U_c(t_2)$ and an inductor current $i_L(t_2)$ at a $t_2$ moment are solved, i.e., a zero-input response of the circuit is solved. The two-order differential equation established according to a topological schematic diagram when the Buck is off is:

$$LC\frac{dU_c(t)}{dt_2} + \frac{L}{R}\frac{dU_c}{dt} + U_c = 0 \quad (6)$$

Similarly, substituting $U_c(0_+)=U_c(0_-)=U_c(t_1)$ and $i_L(0_+)=i_L(0_-)=i_L(t_1)$, a Toff capacitor voltage model is as shown in a formula (7) and a Toff inductor current model is as shown in a formula (8):

$$U'_c(t) = \frac{U_c(t_1)}{\sin\beta_3}e^{-\delta t}\sin(\omega t + \beta_3) \quad (7)$$

$$i'_L(t) = \frac{i_L(t_1)}{\sin\beta_4}e^{-\delta t}\sin(\omega t + \beta_4) \quad (8)$$

Where $$\tan\beta_3 = \frac{1}{\left(\frac{\delta}{\omega} + \frac{i_L(t_1)R - U_c(t_1)}{\omega RC U_c(t_1)}\right)} \text{ and } \tan\beta_4 = \frac{1}{\left(\frac{\delta}{\omega} - \frac{U_c(t_1)}{\omega L i_L(t_1)}\right)}.$$

According to the formulas (4) and (7), it may be seen that the Buck circuit has oscillation and overshoot phenomena in a start process, and needs relatively long time to enter a steady state.

At the $t_2$ moment, the formulas (7) and (8) are associated with a steady-state voltage $U_c(\infty)$ and a steady-state current $i_L(\infty)$ to obtain an equation containing the $t_1$ and the $t_2$.

$$\begin{cases} \frac{U_c(t_1)}{\sin\beta_3}e^{-\delta t}\sin(\omega t + \beta_3) = U_c(\infty) \\ \frac{i_L(t_1)}{\sin\beta_4}e^{-\delta t}\sin(\omega t + \beta_4) = i_L(\infty) \end{cases} \quad (9)$$

Figure 2:
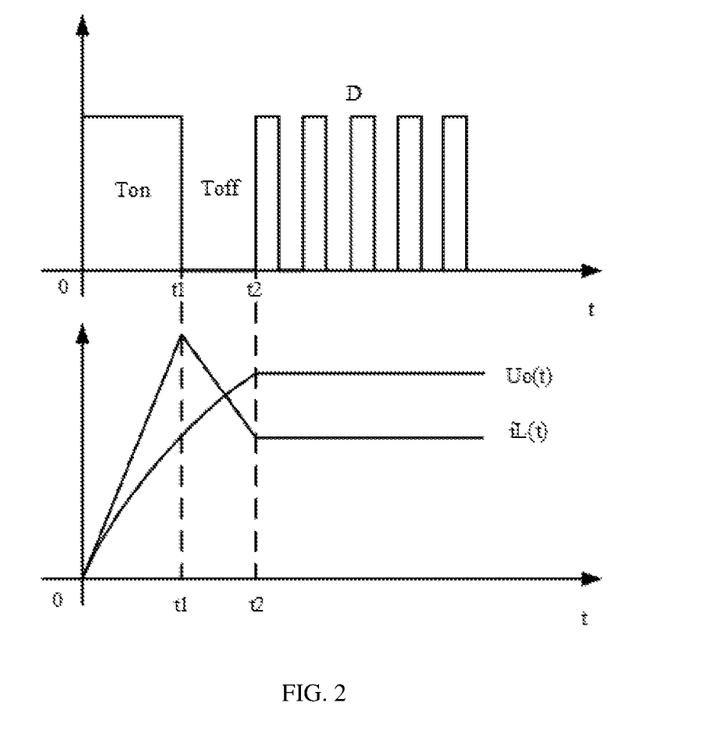
FIG. 2 is a control schematic diagram of a segmented quick start control method provided by an embodiment of the present invention.

For the phenomena of oscillation, overshoot and long start time of the Buck circuit in start, the present invention provides a segmented quick start control method. As shown in FIG. 2, within an initial time period of the start (i.e., 0-$t_1$ time period), duty ratio D=1, i.e., Ton, the output voltage rises at a fastest rate and the capacitor C is charged. In a remaining time period, i.e., $t_1$-$t_2$ moment, duty ratio D=0, i.e., Toff, the output voltage keeps to rise and is simultaneously stabilized; and after the $t_2$ moment, the system enters a steady state and the start is completed.

Figure 3:
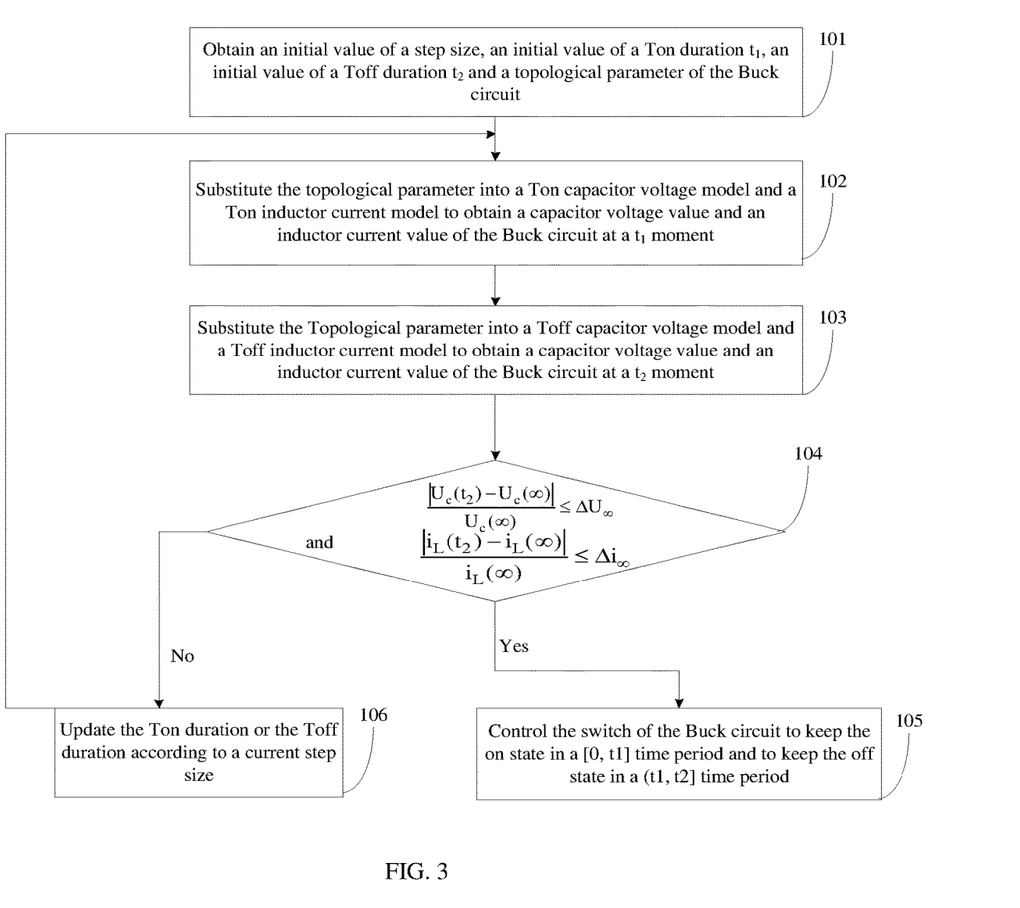
FIG. 3 is a flowchart of a quick start control method for a Buck circuit provided by an embodiment of the present invention.

FIG. 3 is a flowchart of a quick start control method for a Buck circuit provided by the present invention. As shown in FIG. 3, the control method includes the following steps:

Step 101: obtain an initial value of a step size, an initial value of a Ton duration $t_1$, an initial value of a Toff duration $t_2$ and a topological parameter of the Buck circuit. In this embodiment, the initial value of the step size is $\Delta t_0 = T/10$, where the T represents a switch cycle after the Buck circuit enters a steady state. The initial value of the Ton duration $t_1$ is 0, and the initial value of the Toff duration $t_2$ is 0. The topological parameter includes an inductance value, a capacitance value, a load, a steady-state voltage, a steady-state current and a steady-state switch cycle.

Step 102: substitute the topological parameter into a Ton capacitor voltage model and a Ton inductor current model to obtain a capacitor voltage value $U_c(t_1)$ and an inductor current value $i_L(t_1)$ of the Buck circuit at a $t_1$ moment, where the Ton voltage model is an expression of a capacitor voltage when a switch of the Buck circuit is in an on state, and the Ton inductor current model is an expression of an inductor current when the switch of the Buck circuit is in the on state;

Step 103: substitute the topological parameter into a Toff capacitor voltage model and a Toff inductor current model to obtain a capacitor voltage value $U_c(t_2)$ and an inductor current value $i_L(t_2)$ of the Buck circuit at a $t_2$ moment, where the Toff voltage model is an expression of the capacitor voltage when the switch of the Buck circuit is in an off state, and the Toff inductor current model is an expression of the inductor current when the switch of the Buck circuit is in the off state.

Step 104: determine whether a condition:

$$\frac{|U_c(t_2) - U_c(\infty)|}{U_c(\infty)} \leq \Delta U_\infty \text{ and } \frac{|i_L(t_2) - i_L(\infty)|}{i_L(\infty)} \leq \Delta i_\infty,$$

is met to obtain a first determining result, where the $U_c(\infty)$ represents a steady-state value of the capacitor voltage, the $i_L(\infty)$ represents a steady-state average value of the inductor current, the $\Delta U_\infty$ represents an output voltage error threshold, and the $\Delta i_\infty$ represents an inductor current error threshold; In this embodiment, $\Delta U_\infty = 0.001$ and $\Delta i_\infty = 0.001$.

When the first determining result indicates yes, a step 105 is executed.

When the first determining result indicates no, a step 106 is executed and the step 102 is returned.

Step 105: control the switch of the Buck circuit to keep the on state in a [0, t1] time period and to keep the off state in a (t1, t2] time period.

Step 106: update the Ton duration or the Toff duration according to a current step size.

Figure 4:
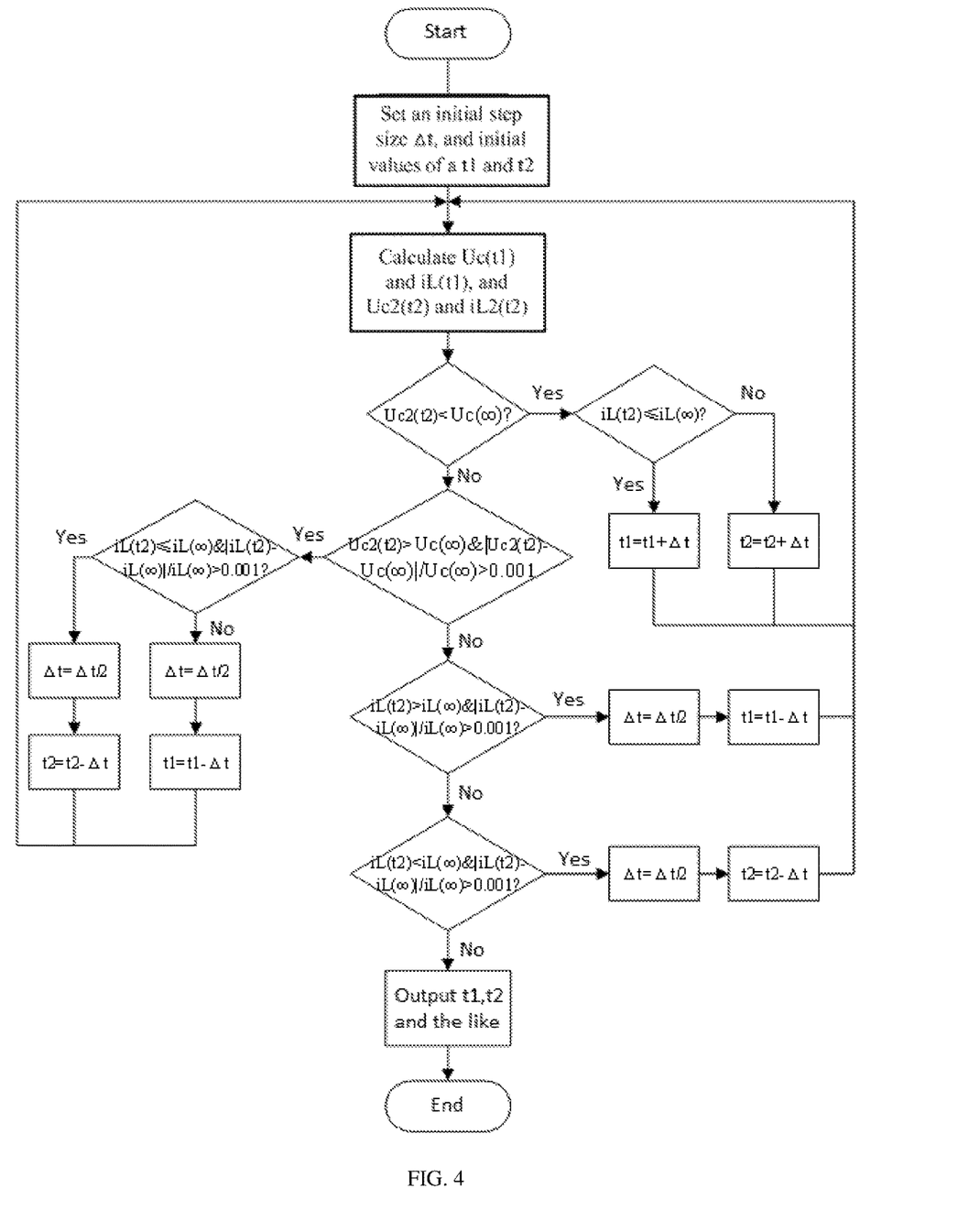
FIG. 4 is a flowchart for updating a Ton duration or a Toff duration according to a current step size provided by an embodiment of the present invention.

FIG. 4 is a flowchart for updating a Ton duration or a Toff duration according to a current step size provided by the present invention. As shown in FIG. 4, the step of updating the Ton duration or the Toff duration according to the current step size specifically includes the following steps:

Determine whether a condition: $U_c'(t_2) < U_c(\infty)$, is met to obtain a second determining result.

When the second determining result indicates yes, determine whether a condition: $i_L'(t_2) \leq i_L(\infty)$, is met to obtain a third determining result.

When the third determining result indicates yes, update the Ton duration according to a formula: $t_1' = t_1 + \Delta t$, where the $t_1'$ represents an updated Ton duration, the $t_1$ represents a Ton duration before being updated, and the $\Delta t$ represent a current step size.

When the third determining result indicates no, update the Toff duration according to a formula: $t_2' = t_2 + \Delta t$, where the $t_2'$ represents an updated Toff duration, and the $t_2$ represents a Toff duration before being updated.

When the second determining result indicates no, determine whether a condition: $U_c'(t_2) > U_c(\infty)$ and $$\frac{|i_L'(t_2) - i_L(\infty)|}{i_L(\infty)} > \Delta i_\infty,$$

is met to obtain a fourth determining result.

When the fourth determining result indicates yes, determine whether a condition: $i_L'(t_2) \leq i_L(\infty)$ and $$\frac{|i_L'(t_2) - i_L(\infty)|}{i_L(\infty)} > \Delta i_\infty,$$

is met to obtain a fifth determining result.

When the fifth determining result indicates yes, update the step size according to a formula: $\Delta t' = \Delta t/2$, where the $\Delta t'$ represents an updated step size, and the $\Delta t$ represents a step size before being updated.

Update the Toff duration according to a formula: $t_2' = t_2 - \Delta t'$, where the $t_2'$ represents an updated Toff duration, and the $t_2$ represents a Toff duration before being updated.

When the fifth determining result indicates no, update the step size according to a formula: $\Delta t' = \Delta t/2$, and update the Ton duration according to a formula $t_1' = t_1 - \Delta t'$, where the $t_1'$ represents an updated Ton duration and the $t_1$ represents a Ton duration before being updated.

When the fourth determining result indicates yes, determine whether a condition: $i_L'(t_2) > i_L(\infty)$ and $$\frac{|i_L'(t_2) - i_L(\infty)|}{i_L(\infty)} > \Delta i_\infty,$$

is met to obtain a sixth determining result.

When the sixth determining result indicates yes, update the step size according to a formula: $\Delta t' = \Delta t/2$, where the $\Delta t'$ represents an updated step size, and the $\Delta t$ represents a step size before being updated; and update the Ton duration according to a formula: $t_1' = t_1 - \Delta t'$, where the $t_1'$ represents an updated Ton duration, and the $t_1$ represents a Ton duration before being updated.

When the sixth determining result indicates no, determine whether a condition: $i_L'(t_2) < i_L(\infty)$ and $$\frac{|i_L'(t_2) - i_L(\infty)|}{i_L(\infty)} > \Delta i_\infty,$$

is met to obtain a seventh determining result.

When the seventh determining result indicates yes, update the step size according to a formula: $\Delta t' = \Delta t/2$, where the $\Delta t'$ represents an updated step size, and the $\Delta t$ represents a step size before being updated; and update the Toff duration according to a formula: $t_2' = t_2 - \Delta t'$, where the $t_2'$ represents an updated Toff duration, and the $t_2$ represents a Toff duration before being updated.

Figure 5:
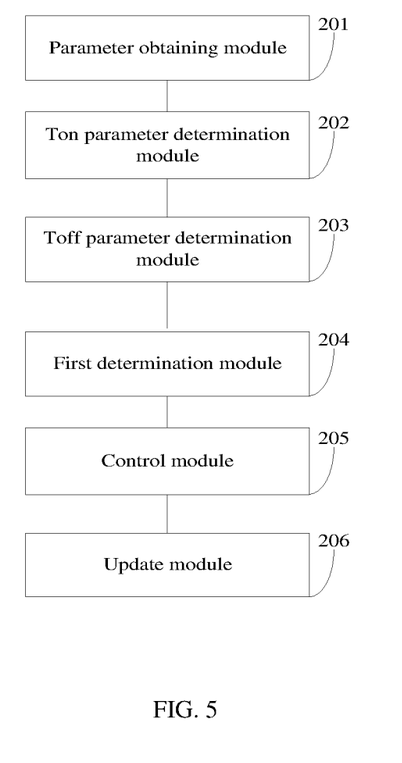
FIG. 5 is a structural block diagram of a quick start control system for a Buck circuit provided by an embodiment of the present invention.

FIG. 5 is a structural block diagram of a quick start control system for a Buck circuit provided by the present invention. As shown in FIG. 5, the control system includes:

a parameter obtaining module 201, configured to obtain an initial value of a step size, an initial value of a Ton duration $t_1$, an initial value of a Toff duration $t_2$ and a topological parameter of the Buck circuit;

a Ton parameter determination module 202, configured to substitute the topological parameter into a Ton capacitor voltage model and a Ton inductor current model to obtain a capacitor voltage value $U_c(t_1)$ and an inductor current value $i_L(t_1)$ of the Buck circuit at a $t_1$ moment, where the Ton voltage model is an expression of a capacitor voltage when a switch of the Buck circuit is in an on state, and the Ton inductor current model is an expression of an inductor current when the switch of the Buck circuit is in the on state;

a Toff parameter determination module 203, configured to substitute the topological parameter into a Toff capacitor voltage model and a Toff inductor current model to obtain a capacitor voltage value $U_c(t_2)$ and an inductor current value $i_L(t_2)$ of the Buck circuit at a $t_2$ moment, where the Toff voltage model is an expression of the capacitor voltage when the switch of the Buck circuit is in an off state, and the Toff inductor current model is an expression of the inductor current when the switch of the Buck circuit is in the off state;

a first determination module 204, configured to determine whether a condition:

$$\frac{|U_c(t_2) - U_c(\infty)|}{U_c(\infty)} \leq \Delta U_\infty \text{ and } \frac{|i_L(t_2) - i_L(\infty)|}{i_L(\infty)} \leq \Delta i_\infty,$$

is met to obtain a first determining result, where the $U_c(\infty)$ represents a steady-state value of the capacitor voltage, the $i_L(\infty)$ represents a steady-state average value of the inductor current, the $\Delta U_\infty$ represents an output voltage error threshold, and the $\Delta i_\infty$ represents an inductor current error threshold;

a control module 205, configured to control, when the first determining result indicates yes, the switch of the Buck circuit to keep the on state in a [0, t1] time period and to keep the off state in a (t1, t2] time period; and an update module 206, configured to update, when the first determining result indicates no, the Ton duration or the Toff duration according to a current step size.

For example, for a Buck circuit having an input voltage $U_{in}$=450 V, an output voltage Uo=225 V and an output current Io=50 A, a specific implementation process of the present invention is described as follows, where a steady-state switch frequency of the Buck circuit is f=10 kHz, R=4Ω, a steady-state duty ratio is D=0.5, a ripple voltage ΔU is less than 1%, L=1500 pH and C=220 μF:

(1) Obtain a parameter value such as R, L and C, where an initial step size is $\Delta t_0$=T/10, an initial value of a Ton duration $t_1$ is 0, and an initial value of a Toff duration $t_2$ is 0.

(2) Substitute the initial value of the $t_1$ and the initial value of the $t_2$ into the formulas (4) and (5) to calculate a voltage value $U_c(t_1)$ and a current value $i_L(t_1)$ at a $t_1$ moment, and substitute the initial value of the $t_2$ to the formulas (7) and (8) to calculate a voltage value $U_c'(t_2)$ and a current value $i_L'(t_2)$ at a $t_2$ moment.

(3) Compare a difference value between the $U_c'(t_2)$ and the $U_c(\infty)$ with a difference value between the $i_L'(t_2)$ and the $i_L(\infty)$ to determine whether to update the step size, the $t_1$ and the $t_2$.

(4) If yes, calculate the $t_1$ and the $t_2$ according to an updated step size, and return to the step (2) to calculate the $U_c'(t_2)$, the $U_c(t_1)$, the $i_L(t_1)$ and the $i_L'(t_2)$.

Or otherwise, output obtained voltage, current, and values of the $t_1$ and the $t_2$, and output the number of calculation steps.

Figure 6:
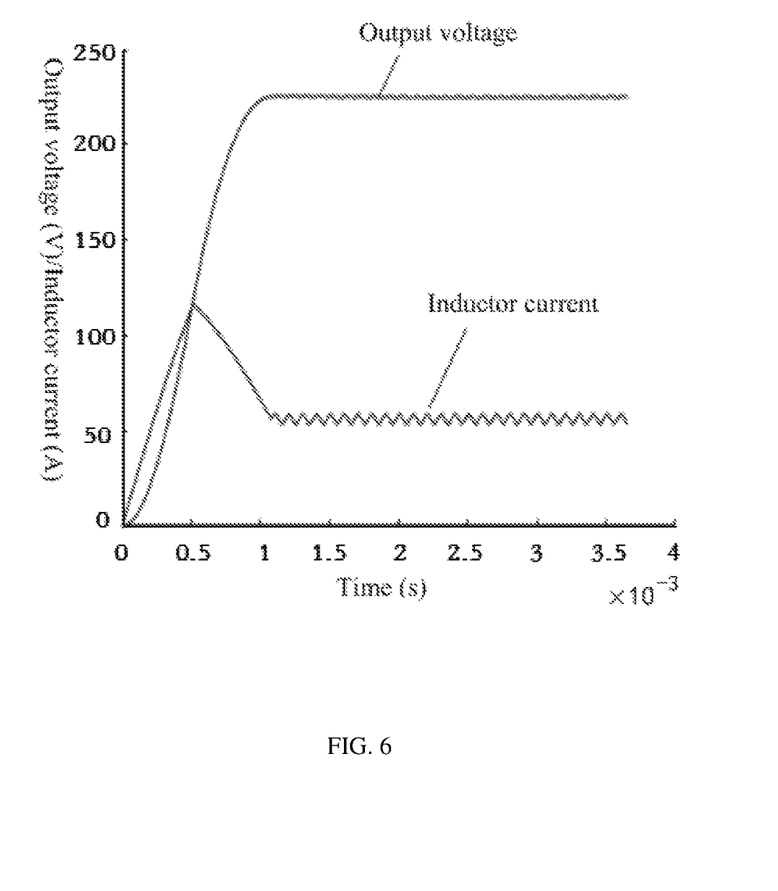
FIG. 6 is an oscillogram of an output voltage and an inductor current of a Buck circuit provided by an embodiment of the present invention.

Herein, it is to be noted that the connection problem with control of the stead-state duty ratio after the $t_2$ moment is solved by changing an on time distribution but not a cycle, e.g., turning on a ¼ duty ratio first and turning off, and then turning on a ¼ duty ratio. A simulation result of an output voltage and an inductor current of the Buck circuit is as shown in FIG. 6. As can be seen from FIG. 6, the segmented quick start control method provided by the present invention has very good start control effect to the Buck circuit, stabilizes the output voltage within 1.1 ms, and has fast response speed and less than 1% of ripple voltage, thereby implementing the quick start of the Buck circuit without oscillation and overshoot. The method is applied to an occasion having a strict requirement on start time, and can be promoted to other switch converters using PWM.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A quick start control method for a Buck circuit, comprising:

obtaining an initial value of a step size, an initial value of a total-on (Ton) duration $t_1$, an initial value of a total-off (Toff) duration $t_2$ and a topological parameter of the Buck circuit;

substituting the topological parameter into a Ton capacitor voltage model and a Ton inductor current model to obtain a capacitor voltage value $U_c(t_1)$ and an inductor current value $i_L(t_1)$ of the Buck circuit at a $t_1$ moment, wherein the Ton voltage model is an expression of a capacitor voltage when a switch of the Buck circuit is in an on state, and the Ton inductor current model is an expression of an inductor current when the switch of the Buck circuit is in the on state;

substituting the topological parameter into a Toff capacitor voltage model and a Toff inductor current model to obtain a capacitor voltage value $U_c'(t_2)$ and an inductor current value $i_L'(t_2)$ of the Buck circuit at a $t_2$ moment, wherein the Toff voltage model is an expression of the capacitor voltage when the switch of the Buck circuit is in an off state, and the Toff inductor current model is an expression of the inductor current when the switch of the Buck circuit is in the off state;

determining whether a condition:

$$\frac{|U_c'(t_2) - U_c(\infty)|}{U_c(\infty)} \le \Delta U_\infty \text{ and } \frac{|i_L'(t_2) - i_L(\infty)|}{i_L(\infty)} \le \Delta i_\infty,$$

is met to obtain a first determining result, wherein the $U_c(\infty)$ represents a steady-state value of the capacitor voltage, the $I_L(\infty)$ represents a steady-state average value of the inductor current, the $\Delta U_\infty$ represents an output voltage error threshold, and the $\Delta i_\infty$ represents an inductor current error threshold;

when the first determining result indicates yes, controlling the switch of the Buck circuit to keep the on state in a [0, $t_1$] time period and to keep the off state in a ($t_1$, $t_2$] time period; and when the first determining result indicates no, updating the Ton duration or the Toff duration according to a current step size, and returning to the "substituting the topological parameter into a Ton capacitor voltage model and a Ton inductor current model to obtain a capacitor voltage value $U_c(t_1)$ and an inductor current value $i_L(t_1)$ of the Buck circuit at a $t_1$ moment;

wherein the updating the Ton duration or the Toff duration according to a current step size specifically comprises:

determining whether a condition: $U_c'(t_2)<U_c(\infty)$, is met to obtain a second determining result;

when the second determining result indicates yes, determining whether a condition: $i_L'(t_2) \le i_L(\infty)$, is met to obtain a third determining result; and when the third determining result indicates yes, updating the Ton duration according to a formula: $t_1'=t_1+\Delta t$, wherein the $t_1'$ represents an updated Ton duration, the $t_1$ represents a Ton duration before being updated, and the $\Delta t$ represents a current step size;

when the third determining result indicates no, updating the Toff duration according to a formula: $t_2'=t_2+\Delta t$, wherein the $t_2'$ represents an updated Toff duration, and the $t_2$ represents a Toff duration before being update.

2. The control method according to claim 1, when the second determining result indicates no, determining whether a condition: $U_c'(t_2) > U_c(\infty)$ and $$\frac{|i_L'(t_2) - i_L(\infty)|}{i_L(\infty)} > \Delta i_\infty,$$

is met to obtain a fourth determining result;
  when the fourth determining result indicates yes, determining whether a condition: $i_L'(t_2) \leq i_L(\infty)$ and $$\frac{|i_L'(t_2) - i_L(\infty)|}{i_L(\infty)} > \Delta i_\infty,$$

is met to obtain a fifth determining result;
  when the fifth determining result indicates yes, updating the step size according to a formula: $\Delta t' = \Delta t/2$, wherein the $\Delta t'$ represents an updated step size, and the $\Delta t$ represents a step size before being updated; and
  updating the Toff duration according to a formula: $t_2' = t_2 - \Delta t'$, wherein the $t_2'$ represents an updated Toff duration, and the $t_2$ represents a Toff duration before being updated.

3. The control method according to claim 2, when the fifth determining result indicates no, updating the step size according to a formula: $\Delta t' = \Delta t/2$; and
  updating the Ton duration according to a formula: $t_1' = t_1 - \Delta t'$, wherein the $t_1'$ represents an updated Ton duration, and the $t_1$ represents a Ton duration before being updated.

4. The control method according to claim 2, when the fourth determining result indicates no, determining whether a condition: $i_L'(t_2) > i_L(\infty)$ and $$\frac{|i_L'(t_2) - i_L(\infty)|}{i_L(\infty)} \leq \Delta i_\infty,$$

is met to obtain a sixth determining result;
  when the sixth determining result indicates yes, updating the step size according to a formula: $\Delta t' = \Delta t/2$, wherein the $\Delta t'$ represents an updated step size, and the $\Delta t$ represents a step size before being updated; and
  updating the Ton duration according to a formula: $t_1' = t_1 - \Delta t'$, wherein the $t_1'$ represents an updated Ton duration, and the $t_1$ represents a Ton duration before being updated.

5. The control method according to claim 4, when the sixth determining result indicates no, determining whether a condition: $i_L'(t_2) < i_L(\infty)$ and $$\frac{|i_L'(t_2) - i_L(\infty)|}{i_L(\infty)} > \Delta i_\infty,$$

is met to obtain a seventh determining result;
  when the seventh determining result indicates yes, updating the step size according to a formula: $\Delta t' = \Delta t/2$, wherein the $\Delta t'$ represents an updated step size, and the $\Delta t$ represents a step size before being updated; and
  updating the Toff duration according to a formula: $t_2' = t_2 - \Delta t'$, wherein the $t_2$ represents an updated Toff duration, and the $t_2$ represents a Toff duration before being updated.

6. A quick start control system for a Buck circuit, comprising:
  a parameter obtaining module, configured to obtain an initial value of a step size, an initial value of a total-on (Ton) duration $t_1$, an initial value of a total-off (Toff) duration $t_2$ and a topological parameter of the Buck circuit;
  a Ton parameter determination module, configured to substitute the topological parameter into a Ton capacitor voltage model and a Ton inductor current model to obtain a capacitor voltage value $U_c(t_1)$ and an inductor current value $i_L(t_1)$ of the Buck circuit at a $t_1$ moment, wherein the Ton voltage model is an expression of a capacitor voltage when a switch of the Buck circuit is in an on state, and the Ton inductor current model is an expression of an inductor current when the switch of the Buck circuit is in the on state;
  a Toff parameter determination module, configured to substitute the topological parameter into a Toff capacitor voltage model and a Toff inductor current model to obtain a capacitor voltage value $U_c(t_2)$ and an inductor current value $i_L(t_2)$ of the Buck circuit at a $t_2$ moment, wherein the Toff voltage model is an expression of the capacitor voltage when the switch of the Buck circuit is in an off state, and the Toff inductor current model is an expression of the inductor current when the switch of the Buck circuit is in the off state;
  a first determination module, configured to determine whether a condition:

$$\frac{|U_c(t_2) - U_c(\infty)|}{U_c(\infty)} \leq \Delta U_\infty \text{ and } \frac{|i_L'(t_2) - i_L(\infty)|}{i_L(\infty)} \leq \Delta i_\infty,$$

is met to obtain a first determining result, wherein the $U_c(\infty)$ represents a steady-state value of the capacitor voltage, the $i_L(\infty)$ represents a steady-state average value of the inductor current, the $\Delta U_\infty$ represents an output voltage error threshold, and the $\Delta i_\infty$ represents an inductor current error threshold;
  a control module, configured to control, when the first determining result indicates yes, the switch of the Buck circuit to keep the on state in a $[0, t_1]$ time period and to keep the off state in a $(t_1, t_2]$ time period; and
  an update module, configured to update, when the first determining result indicates no, the Ton duration or the Toff duration according to a current step size; wherein the updating the Ton duration or the Toff duration according to a current step size specifically comprises:
  determining whether a condition: $U_c'(t_2) < U_c(\infty)$, is met to obtain a second determining result;
  when the second determining result indicates yes, determining whether a condition: $i_L(t_2) \leq i_L(\infty)$, is met to obtain a third determining result; and
  when the third determining result indicates yes, updating the Ton duration according to a formula: $t_1' = t_1 + \Delta t$, wherein the $t_1'$ represents an updated Ton duration, the $t_1$ represents a Ton duration before being updated, and the $\Delta t$ represents a current step size;
  when the third determining result indicates no, updating the Toff duration according to a formula: $t_2' = t_2 + \Delta t$, wherein the $t_2'$ represents an updated Toff duration, and the $t_2$ represents a Toff duration before being update.

* * * * *